US007689232B1

(12) United States Patent
Beyer, Jr.

(10) Patent No.: US 7,689,232 B1
(45) Date of Patent: Mar. 30, 2010

(54) METHOD OF PROVIDING CALL FORWARD OF VOICE AND MESSAGES AND REMOTE PHONE ACTIVATION

(76) Inventor: Malcolm K. Beyer, Jr., 92 Lighthouse Dr., Jupiter Inlet Colony, FL (US) 33469-3504

( * ) Notice: Subject to any disclaimer, the term of this patent is extended or adjusted under 35 U.S.C. 154(b) by 505 days.

(21) Appl. No.: 11/623,862

(22) Filed: Jan. 17, 2007

Related U.S. Application Data

(63) Continuation-in-part of application No. 11/308,648, filed on Apr. 17, 2006, and a continuation-in-part of application No. 10/711,490, filed on Sep. 21, 2004, now Pat. No. 7,031,728.

(51) Int. Cl.
*H04W 24/00* (2009.01)
(52) U.S. Cl. ............... 455/457; 455/414.1; 455/456.6; 455/456.3; 342/357.09; 342/357.1
(58) Field of Classification Search ............. 455/456.1, 455/456.2, 456.3, 457, 414.1; 342/357.09, 342/357.1
See application file for complete search history.

(56) References Cited

U.S. PATENT DOCUMENTS

| | | | |
|---|---|---|---|
| 6,434,403 B1 * | 8/2002 | Ausems et al. ............ 455/556.2 |
| 6,792,265 B1 * | 9/2004 | Chan et al. ................. 455/416 |
| 7,231,208 B2 * | 6/2007 | Robertson et al. ............ 455/416 |
| 2002/0137502 A1 * | 9/2002 | Cronin et al. ................ 455/419 |
| 2004/0192331 A1 * | 9/2004 | Gorday et al. ............ 455/456.1 |
| 2005/0032525 A1 * | 2/2005 | Gasbarro ................. 455/456.1 |
| 2005/0232249 A1 * | 10/2005 | Mishra ........................ 370/352 |

* cited by examiner

*Primary Examiner*—Rafael Pérez-Gutiérrez
*Assistant Examiner*—Neda Behrooz
(74) *Attorney, Agent, or Firm*—Malin Haley DiMaggio Bowen & Lhota, P.A.

(57) ABSTRACT

A method, a combined cellular, PDA communication device and system having specialized software applications for allowing a plurality of combined cellular phone/PDA device users to monitor each others' locations and status, to initiate cellular phone calls by touching a symbol on the touch screen display with a stylus which can also include point to call conferencing calling. Each participant's cellular phone/PDA device includes a GPS navigation receiver with application software for point to call cellular phone initiation to participants and geographical entities including vehicles, persons or events, conference calls and video transfers. The method, device and system also includes several features that allow each individual cell phone/PDA device user to: a) forward calls and data by touching the symbols associated with other participants; b) cause another phone to accept a phone call even though the remote phone is busy and put the remote call on hold; c) cause a remote phone speaker and microphone to turn on and receive voice message from the calling phone; and d) cause a voice recording to be heard when the a symbol that has an associated voice recording is hooked.

11 Claims, 8 Drawing Sheets

METHOD OF PROVIDING CALL FORWARD OF VOICE AND MESSAGES AND REMOTE PHONE ACTIVATION

This application is a continuation-in-part of U.S. patent application Ser. No. 11/308,648 filed Apr. 17, 2006 which is a continuation-in-part of U.S. patent application Ser. No. 10/711,490 now U.S. Pat. No. 7,031,728.

BACKGROUND OF THE INVENTION

1. Field of the Invention

A communications system using a plurality of cellular phones each having an integrated PDA and GPS receiver for the management of two or more people through the use of a communications network. The method and system provide each user with an integrated handheld cellular/PDA/GPS/phone that has advanced communication software application programs (hereinafter referred to as ACS) and databases used in conjunction with a remote server that enable a user to control the user's cell phone and to remotely control other users' cellular/PDA phones with call forward and playing a pre-recorded message.

2. Description of Related Art

The purpose of a communications system is to transmit information bearing digital messages from a source, located at one point, to a user destination, located at another point some distance away. A communications system is generally comprised of three basic elements: transmitter, information channel and receiver. One form of communication in recent years is cellular phone telephony. A network of cellular communication systems set up around an area such as the United States allows multiple users to talk to each other, either on individual calls or on group calls. Some cellular phone services enable a cellular phone to engage in conference calls with a small number of users. Furthermore, cellular conference calls can be established through 800 number services. Cellular telephony also now includes systems that include Global Positioning System (GPS) navigation that utilizes satellite navigation. These devices thus unite cellular phone technology with navigation information, computer information transmission and receipt of data.

The method and operation of communication devices used herein are described in U.S. Pat. No. 7,031,728 which is hereby incorporated by reference and pending U.S. patent application Ser. No. 11/308,648.

It is desirable in certain specific communication networks for a user cell phone to be able to remotely control one or more of the remote user cell phones operating in the entire network to: (a) forward a call by touching a geo-referenced symbol on a PDA/cell phone and selecting a software drawn switch; (b) forward to another party free text, preformatted messages, photographs and videos by touching the party's geo-referenced symbol on a PDA/cell phone; (c) conference another party represented by a geo-referenced symbol by touching the symbol; (d) force a busy remote phone to accept an incoming call; (e) cause a remote phone to automatically accept a call and activate its speaker phone functionality; and (f) associate a voice recording with a symbol and transmit the combined data in a manner that causes the voice recording to be played when a remote operator touches the symbol.

SUMMARY OF THE INVENTION

Applicant's communication system and method described herein is embodied in the advanced communication software (ACS) application programs developed by applicant and installed in the integrated PDA/GPS cell phones used herein.

A plurality of cellular phone/PDA/GPS devices (cell phone devices) each having ACS application programs and databases provides a communication network in conjunction with a remote server with the ability to (a) cause the other PDA/GPS phone devices to start reporting its position and status information to all or selected users equipped with the same cellular phone/PDA software devices in the communications net so that each of the devices exchanges location, status and other information, (b) remotely control from one cell phone device any of the other cell phone devices including the ability to control remote cellular phones to make verbal pre-recorded announcements, place return calls, place calls to another phone number, vibrate, execute text to speech software, change sound intensity, and remotely control software and functions resident on the remote phones, (c) display information by touching the display screen at the remote phone's location on the PDA display, and (d) make calls to or send data to remote phones by touching their display symbols and selecting the appropriate soft switch.

A communication network server acts as a forwarder for IP communications between any combination of cell phone/PDA users and/or PC based users. Network participant location, identity and status messages are sent to the server by each user. Network participant entered tracks are also sent to the server. Because this data is of interest to all the network participants, the server forwards the data received from one participant to all other participants, thus providing the information necessary for all network participants to know the identity, location and status of all other network participants.

The server also acts as a forwarder of data addressed from one participant to one or more addressed participants, thus permitting the transmission of free text, preformatted messages, photographs, video, E-mail and URL data from one network participant to other selected network participants.

The above functions can also be accomplished using peer to peer WiFi, WiMax or other peer to peer communications. However, for use with cellular communications and to assure the level of security that cell phone companies require, a centralized static IP routable server is used.

The IP server also fills another role of being a database from which data can be requested by network participants (i.e. maps, satellite images, or other visual image) or can be pushed to network participants (i.e. symbology and soft switch changes).

It is an object of this invention to enable each participant in the communications net to poll the other net participants to report or cease reporting their locations, identity and status on the communication net.

Another object of this invention is to enable each participant in the communications net to be able to easily transmit an entity of interest to the other participants of the net by touching the display screen at the entity's location on the map, selecting the soft switch representative of the entity's identity causing the symbol's location and identity to be transmitted on the network.

Another object of the invention is to provide a communication system having a plurality of individual cell phones that allows a user of one cell phone to remotely control any of the other cell phone/PDA system phones including the ability to control remote cellular phones that cause another phone to automatically accept a voice call even if busy, to accept and play a pre-recorded message residing in the remote cell phone database, or to accept and play a voice recorded message made and transmitted by the calling user to the remote phone.

PREFERRED EMBODIMENT OF THE INVENTION

A method and communication system that joins a communications network of participants using handheld cell phones having integrated PDA and GPS circuitry with ACS application programs that allow a participant having an Advanced Communications Software (ACS) equipped cell phone to activate and control other participants' remote cell phones/PDAs that contain ACS.

A network communication server acts as a forwarder for IP communications between any combination of cell phone/PDA clients and/or PC based clients. Network participant location, identity and status messages are sent to the server by each client. Network participant entered tracks are also sent to the server. Because this data is of interest to all the network participants, the server forwards the data received from one participant to all other participants, thus providing the information necessary for all network participants to know the identity, location and status of all other network participants.

The server also acts as a forwarder of data addressed from one participant to one or more addressed participants, thus permitting the transmission of free text, preformatted messages, photographs, video, E-mail and URL data from one network participant to other selected network participants.

Figure 1A:
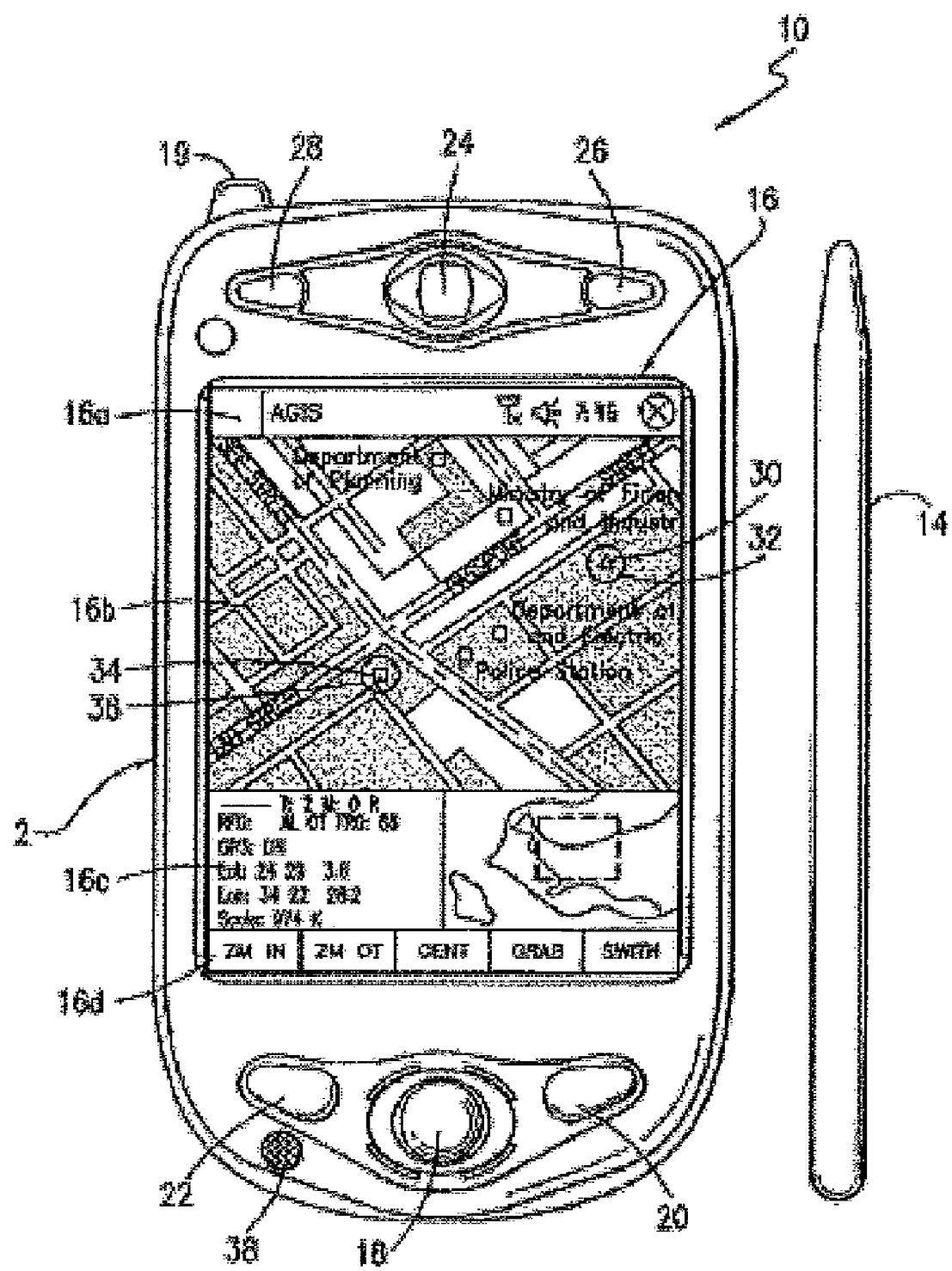
FIG. 1a shows a front plan view of a user cellular phone/PDA/GPS device having a touch display screen in accordance with the invention.

Referring now to the drawings and, in particular, FIG. 1a, a small handheld cellular phone 10 is shown that includes a personal digital assistant (PDA) and a global positioning system receiver (GPS) communications device integrated in housing 12 that includes an on/off power switch 19, a microphone 38, and an LCD display 16 that is also a touch screen system. The small area 16a is the navigation bar that depicts the telephone, GPS and other status data and the active software. Each cell phone includes a CPU and databases that store information useful in the communication network. The CPU also includes a symbol generator for creating touch screen display symbols discussed herein. With the touch screen 16, the screen symbols are entered through GPS inputs or by the operator using a stylus 14 (or operator finger) by manipulatively directing the stylus 14 to literally touch display 16. The soft switches 16d displayed on the display 16 are likewise activated by using a stylus 14 and physically and manipulatively directing the stylus to literally touch display 16. The display x, y coordinates of the touched point are known by a CPU in the PDA section of the communication system in housing 12 that can coordinate various information contained in the PDA relative to the x, y coordinate position on the display 16. Inside housing 12 is contained the conventional cellular phone elements including a modem, a CPU for use with a PDA and associated circuitry connected to speaker 24 and microphone 38. A GPS navigational receiver that receives signals from satellites that can determine the latitude and longitude of the cellular phone housing 12 can be internal or external to the housing 12. Conventional PDA/cellular phones are currently on sale and sold as a unit (or with an external connected GPS) that can be used for cellular telephone calls and sending cellular SMS and TCP/IP or other messages using the PDA's display 16 and computer (CPU). The GPS system including a receiver in housing 12 is capable of determining the latitude and longitude and, through SMS, TCP/IP, WiFi or other digital messaging software, to also transmit this latitude and longitude information of housing 12 to other cellular phones in the communication network via cellular communications, WiFi or radio. The device 10 includes a pair of cellular phone hardware activating buttons 20 to turn the cellular phone on and 22 to turn the cellular phone off. Navigation pad actuator 18 is similar to a joy or force stick in that the actuator 18 manually provides movement commands that can be used by the PDA's software to move a cursor on display 16. Switches 26 and 28 are designed to quickly select an operator specified network software program. Speaker 24 and microphone 38 are used for audio messages. Switch 19 at the top left of device 10 is the power on and power off switch for the entire device.

The heart of the invention lies in the applicant's ACS application programs provided in the device. The ACS programs are activated by clicking on an icon on the display to turn the ACS programs on or off. Mounted within housing 12 as part of the PDA is the display 16 and the CPU. The internal CPU includes databases and software application programs that provide for a geographical map and georeferenced entities that are shown as display portion 16b that includes as part of the display various areas of interest in the particular local map section.

When looking at display 16, the software switches (soft switches) which appear at the very bottom of the display 16d are used to control by touch many of the software driven functions of the cellular phone and PDA. The soft switches are activated through the operator's use of the navigation pad 18, or a small track ball, force stick or similar hardware display cursor pointing device. Alternatively, the operator may choose to activate the software switches by touching the screen with a stylus 14 (or finger) at the switches' 16d locations. When some of the software switches are activated, different software switches appear. The bar display 16d shows the software switches "ZM IN (zoom in)," "ZM OT (zoom out)," "CENT (center)" and "GRAB (pan/grab)" at the bottom of the screen. These software switches enable the operator to perform these functions. The "SWITH (switch)" software switch at the lower right causes a matrix of layered software switches (soft switches) to appear above the bottom row of switches. Through use of the software switches, the operator can also manipulate the geographical map 16b or chart display. When looking at FIG. 1a, display symbols depict permanent geographical locations and buildings are shown. For example, the police station is shown and, when the symbol is touched by the stylus or finger, the latitude and longitude of the symbol's location, as shown in display section 16c, is displayed at the bottom left of the screen. The bottom right side of display 16c is a multifunction inset area that can contain a variety of information including: a) a list of the communication link participants; b) a list of received messages; c) a map, aerial photograph or satellite image with an indication of the zoom and offset location of the main map display, which is indicated by a square that depicts the area actually displayed in the main geographical screen 16b; d) applicable status information; and e) a list of the communication net participants. Each participant user would have a device 10 shown in FIG. 1a.

Also shown on the display screen 16, specifically the geographical display 16b, is a pair of different looking symbols 30 and 34, a small triangle and a small square, which are not labeled. These symbols 30 and 34 can represent communication net participants having cellular phones in the displayed geographical area that are part of the overall cellular phone communications net, each participant having the same device 10 used. The latitude and longitude of symbol 30 is associated within a database with a specific cell phone number and, if available, its IP address and email address. The screen display 16b, which is a touch screen, provides x and y coordinates of the screen 16b to the CPU's software from a map in a geographical database. The software has an algorithm that relates the x and y coordinates to latitude and longitude and can access a communications net participant's symbol or a fixed or movable entity's symbol as being the one closest to that point.

In order to initiate a telephone call to the cellular phone user (communication net participant) represented by symbol (triangle) 30 at a specific latitude and longitude display on chart 16b, the operator touches the triangle 30 symbol with the stylus 14. The operator then touches a "call" software switch from a matrix of displayed soft switches that would overlay the display area 16c. Immediately, the cellular phone will initiate a cellular telephone call to the cellular phone user at the geographical location shown that represents symbol 30. A second cellular phone user (communication net participant) is represented by symbol 34 which is a small square (but could be any shape or icon) to represent an individual cellular phone device in the display area. The ring 32 around symbol 30 indicates that the symbol 30 has been touched and that a telephone call can be initiated by touching the soft switch that says "call." When this is done, the telephone call is initiated. Other types of symbolic elements on the display 16 can indicate that a cellular phone call is in effect. Additionally, the operator can touch both symbol 34 and symbol 30 and can activate a conference call between the two cellular phones and users represented by symbols 30 and 34. Again, a symbolic ring around symbol 34 indicates that a call has been initiated.

Equally important, a user can call the police station or any other specific geographical facility displayed on the map, including: buildings, locations of people, vehicles, restaurants, or other entities, whose cellular phone or land line phone numbers have previously been stored in the database by touching a specific facility location on the map display using the stylus 14 and then touching the cellular phone call switch. As an example, the user can touch and point to call a restaurant using a soft switch by touching the restaurant location with a stylus and then touching the call soft switch. The cellular phone will then call the restaurant. Thus, using the present invention, each participant can touch and point to call to one or more other net participants symbolically displayed on the map, each of whom has a device as shown in FIG. 1a and can also point to call facilities that had been previously stored in the phone's database. Furthermore, this symbol hooking and soft switch technique can be used to go to a fixed facility's website or to automatically enter the fixed facility's Email address in an e-mail.

Each cellular phone/PDA/GPS user device is identified on the map display of the other participant user phone devices by a display symbol that is generated on each user phone display to indicate each user's identity. Each symbol is placed at the correct geographical location on the user display and is correlated with the map on the display. The user of each cellular phone/PDA/GPS device may also enter one or more other fixed entities (buildings, facilities, restaurants, police stations, and the like) and geo-referenced events such as fires, accidents, or other events, into its database. This information can be likewise transmitted to all the other participants on the communications net. The map, fixed entities, events and cellular phone/PDA/GPS device communication net participants' latitude and longitude information is related to the "x" and "y" location on the touch screen display map by a mathematical correlation algorithm.

When the cellular phone/PDA/GPS device user uses a stylus or finger to touch one or more of the symbols or a location displayed on the cellular phone map display, the system's software causes the status and latitude and longitude information concerning that symbol or location to be displayed. In order to hook a symbol or "track" such as another net participant which represents an entity on the geo-referenced map display, or a fixed geographical entity such as a restaurant, police station or a new entity observed by a cell phone user which is discussed below, the user points at or near the location of a geo-referenced symbol appearing on the cellular phone/PDA display that represents a specific track or specific participant or other entity. The hook application software determines that the stylus is pointed close to or at the location of the symbol and puts a circle, square or other indication around the symbol indicating that amplification information concerning the symbol is to be displayed and indicating that additional data or change in data can be made to the indicated symbol. The hook application code then sends a message to the display application code to display the net participant, facility or entity's amplifying data. The display application code retrieves the primary data and amplification data concerning the symbol or entity from the database and displays the information at the correct screen location. The user can then read the amplification data that relates to that specific symbol at the specific location. The cell phone user can also select soft switches on the touch screen display to change the primary data and amplification data. Furthermore, the user can use a similar method of hooking and selecting to activate particular soft switches to take other actions which could include: making cellular phone calls, conference calls, 800 number calls; sending a free text message, operator selected preformatted messages, photographs or videos to the hooked symbol; or to drop a entered symbol.

Each known net participant has a cellular phone number, IP address and, if available, E-mail address that is stored in each participant's device database.

To use the communication system, the user starts the PDA/cellular phone device system by selecting the cell phone and network software which causes: a) the cellular phone to be activated (if it has not already been activated); b) the GPS interface receiver to be established; c) a map of the geographic area where the operator is located and operator's own unit symbol to appear at the correct latitude and longitude on the map on the display; d) the locations of fixed facilities such as restaurants, hotels, fire departments, police stations, and military barracks, that are part of the database to appear as symbols on the map; e) the device selected item read out area which provides amplification information for the communications net participants or the entity that has been hooked (on the display screen) to appear on the display; f) an insert area that contains various data including: the list of net participants, a list of messages to be read, an indication of what portion of the map is being displayed in major map area and other information to appear on the display; and g) a row of primary software created "soft switches" that are always present on the display to appear.

For point to call network units and fixed facilities, the application code detects the x, y display screen location of the symbol that is designated by the user's stylus and translates the x, y coordinates to latitude and longitude and then: (1) searches the database to find the symbol at that location, (2) places a "hook" indicator (a circle, square or other shape) around the symbol, (3) displays any amplifying data and (4) obtains the symbol's associated phone number (or for VoIP calls an IP address) from the database. Upon receiving a "call" designation from the soft switch, the user's device's ACS causes the appropriate phone number or IP number to be called. Upon receiving an indication that the phone number is being called, the application code places a box around the symbol (color, dashed or the like). When the call is connected, the box changes to indicate that the connection is made. When the other party hangs up, the box disappears.

As each of the cell phone participants reports its identity, location and status to the other participants' devices, the received data is geo-referenced and filed in their databases that are accessible by identity and by location. This data is then displayed on each cell phone display. When a request for data is received by touching the display screen, a location search is made by the ACS and a symbol modifier (circle, square, or other designs) is generated around the symbol closest to the x, y position of the stylus. When the application code receives a soft switch command to place a phone call or send data, the software uses the phone number (or IP address) associated with the unit to place the call or to send data.

If a cell phone device receives a digital message that a call is being received, the receiving cell phone's ACS application code places a box or similar object around the transmitter symbol indicating who the call is from. When the call is answered, the application software changes the visual characteristics of the box. In a similar manner, when a phone receives a digital text message, photograph or video, a box appears around the transmitter's symbol indicating the transmitter of the message. The point to call network devices are participants and each one has a similar device with the same software for use as a total participant network. Other situations for calling facilities that are not part of the network are described below.

Thus, the user device is capable of initiating a cellular phone call by touch only, and initiating conference calls by touching the geo-referenced map symbols. Furthermore, by using a similar symbol touching technique, a cellular phone can send operator selected messages to cause a remote cellular phone to display and optionally announce emergency and other messages and to optionally elicit a response from the remote cellular phone.

All of the network participants have the same communication cell phone devices described herein. The method and system include the ability of a specific operator device to cause cell phones to exchange data and to provide polling in which other cellular phones, using SMS, internet or WiFi, report periodically based on criteria such as time, speed, distance traveled, or a combination of time, speed and distance traveled. The user can manually poll any or all of the cell phone devices that are used by all of the participants in the communication network having the same devices. The receiving cellular phone application code responds to the polling command with the receiving cellular phone's location and status which could include battery level, GPS status, signal strength and entered track data. Optionally, the phone user can set their phones to report automatically, based on time or distance traveled intervals or another criterion.

The soft switch application software causes a visual display of a matrix such as five across by six up (or another matrix) in which switch names are placed on the cellular/PDA display. The soft switch network application software knows the touch screen location of each of the switches in the matrix and the software routines that will be activated upon touching the switch.

The bottom row of soft switches displayed on the touch screen remains visually fixed. These switches concern the functions that are the most often used. One of the switches causes a matrix of other soft switches to appear above the visually fixed soft switches. These switches are function soft switches, the activation of any one of which causes a different matrix of soft switches to appear, which are known as the action soft switches. When the action soft switches appear, the function soft switch, which caused the action soft switches to appear, itself appears as a label in the lower left (or some other standard location) indicating to the operator the function soft switch that has been selected. When the operator selects an action soft switch, the appropriate application software to accomplish the action is activated.

Upon receiving a soft switch activation message, the ACS accesses the appropriate task execution software which accomplishes the required tasks including: entry of track data, entry of track amplification data, transmission of alpha/numeric messages, photographs, videos, display of messages to be read, selection of map types, placing voice calls, placing conference calls and 800 conference calls, presenting different potential operator selections, control of the display actions, polling network participants, establishing nets of participants (groups) so that communications with all in the group can be accomplished with a single soft switch action, and dropping a previously entered track. By providing a matrix and layers of soft switches which are easily manipulated by a stylus, each cell phone device in the communication network is extremely efficient in accessing and coordinating the appropriate application program for the device to perform.

Figure 1B:
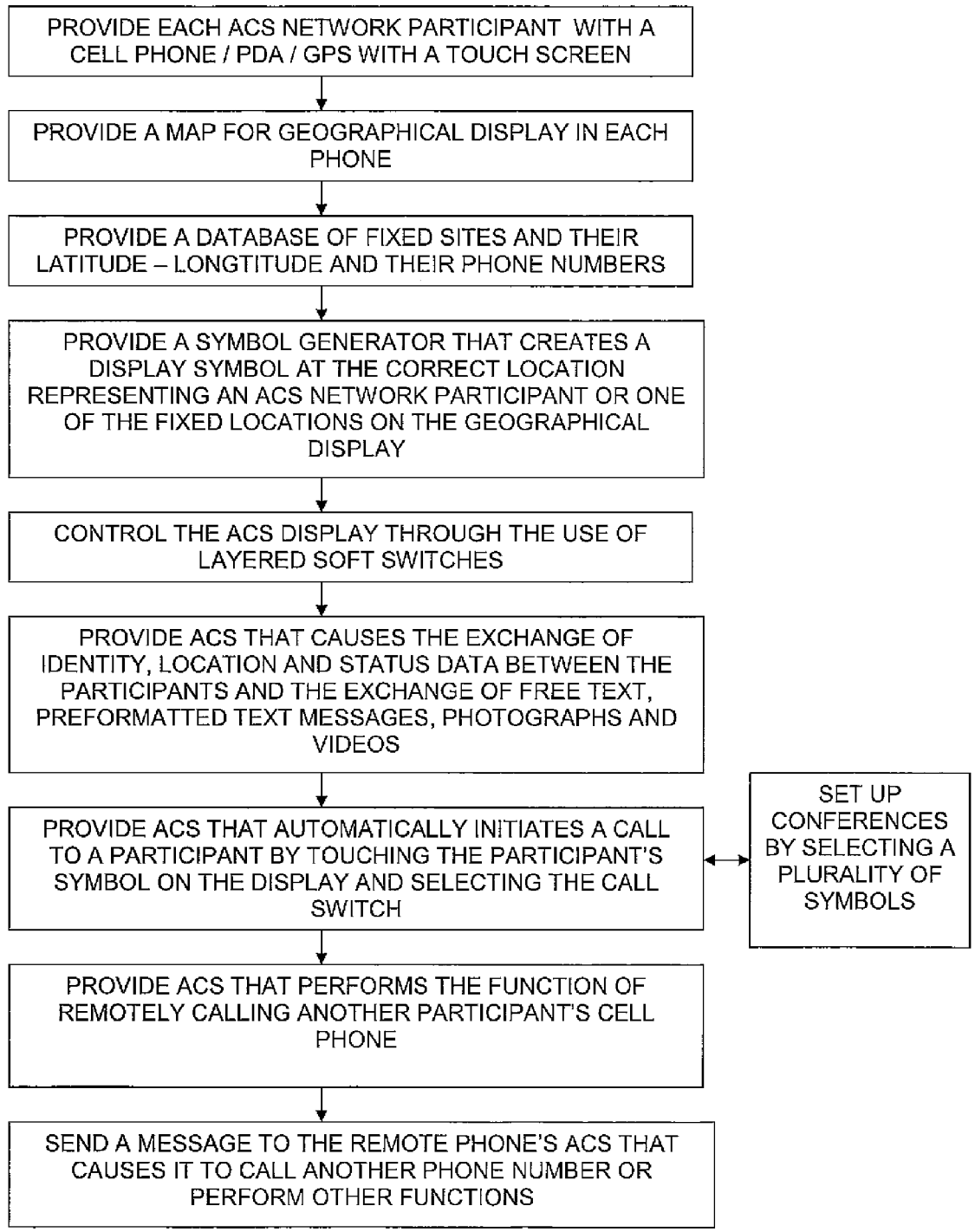
FIG. 1b shows a flow chart of a method that provides for performing the function of remotely calling another participant's cell phone and sending a message to the remote phone's software that causes it to perform specific functions.

Referring now to FIG. 1b, the flow chart is shown that includes the basic steps of providing the network participant with various required elements for display that ultimately provides for automatically initiating a call to a participant by touching the participant's symbol on the display and selecting the call switch which remotely causes the participant's cell phone sending a message that causes the other cell phone to perform the functions described herein.

Figure 2A:
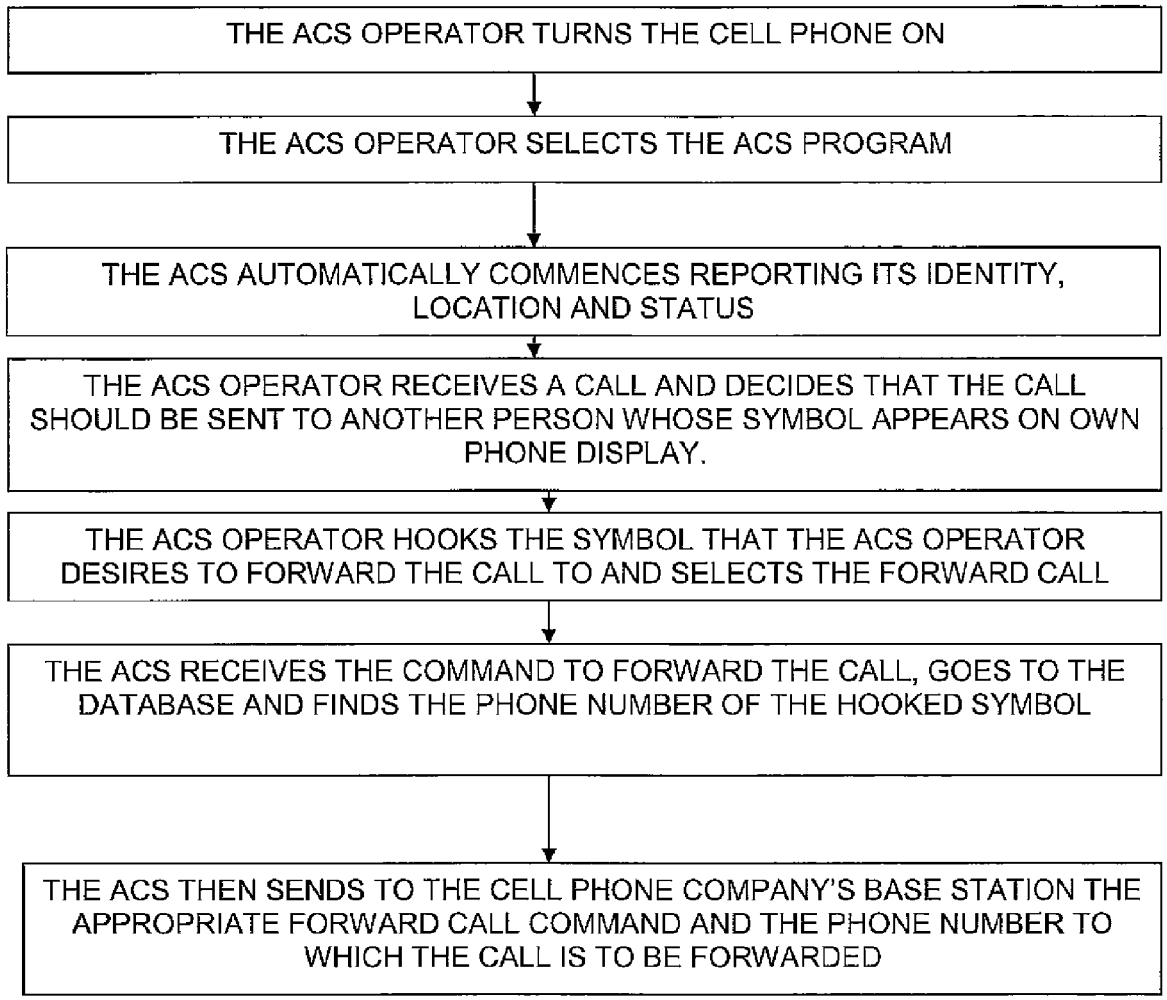
FIG. 2a shows a flow chart of a method for a user cell phone to forward voice calls to a remote cell phone by hooking a symbol on the user's display.

FIG. 2a shows a flow chart describing the method that allows the cell phone to send the cell phone company's base station a forward call digital code and the phone number of the hooked network participant's symbol or a fixed facility's symbol that is in the cell phone's database which causes the cell phone base station to forward the call.

Figure 2B:
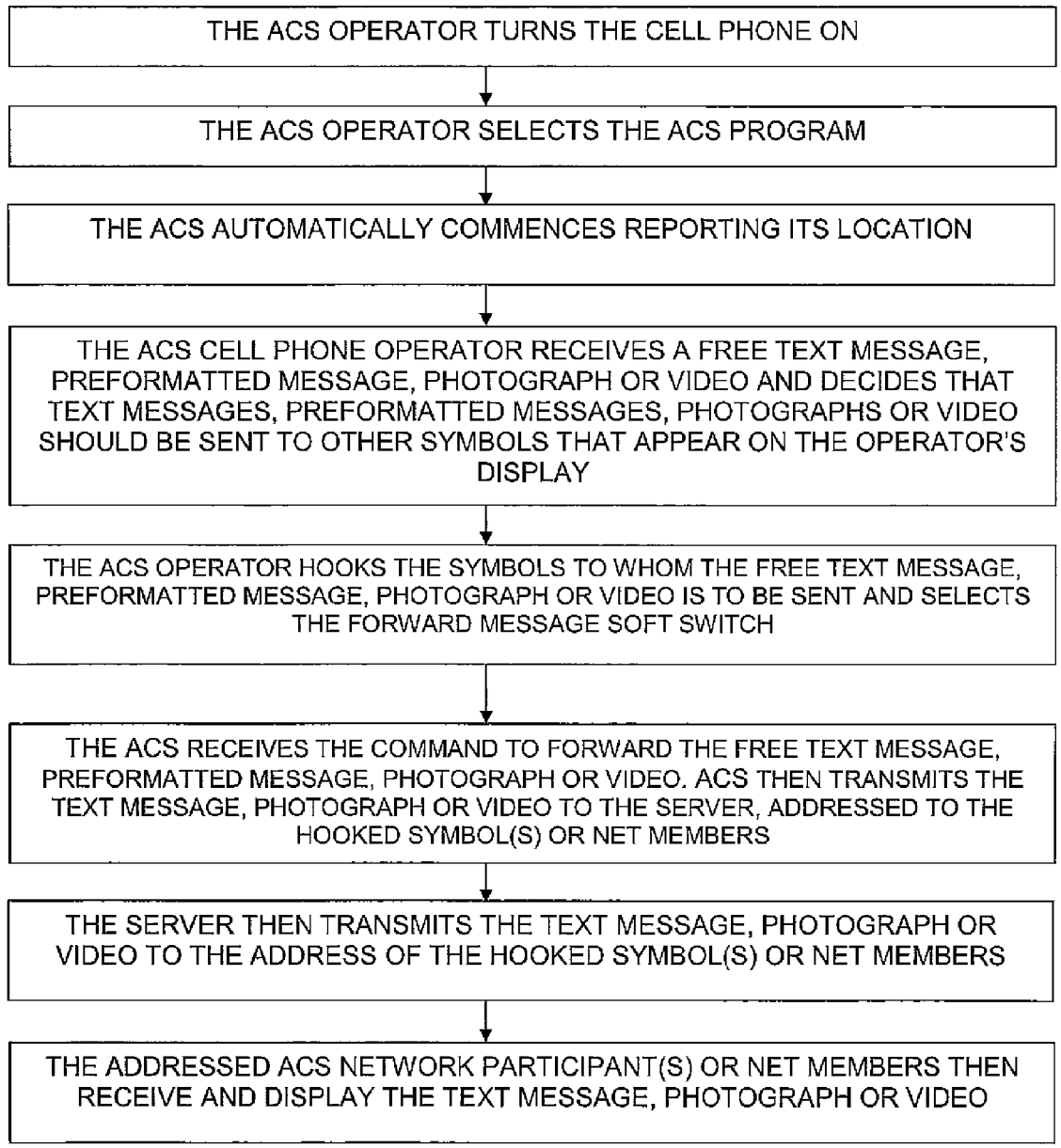
FIG. 2b shows a flow chart of a method for a user cell phone to forward text messages, photographs and video to one or more remote cell phones by hooking a symbol(s) on the user cell phone display.

Referring now to FIG. 2b, the ACS enables the operator to easily forward free text messages, preformatted messages, photographs and video to a remote network participant represented by a symbol appearing on the operator's display. This is accomplished by "hooking" the symbol to whom the data is to be forwarded with a stylus or a finger and selecting the forward soft switch which then causes the ACS in the cell phone/PDA to send the received free text messages, preformatted messages, photographs and video to the Server for retransmission to the hooked symbol(s') phone number or Internet Protocol address. FIG. 2b shows a flow diagram of the method for forwarding free text messages, preformatted messages, photographs and video to a network participant by hooking the symbol to which the message is to be forwarded.

Figure 2C:
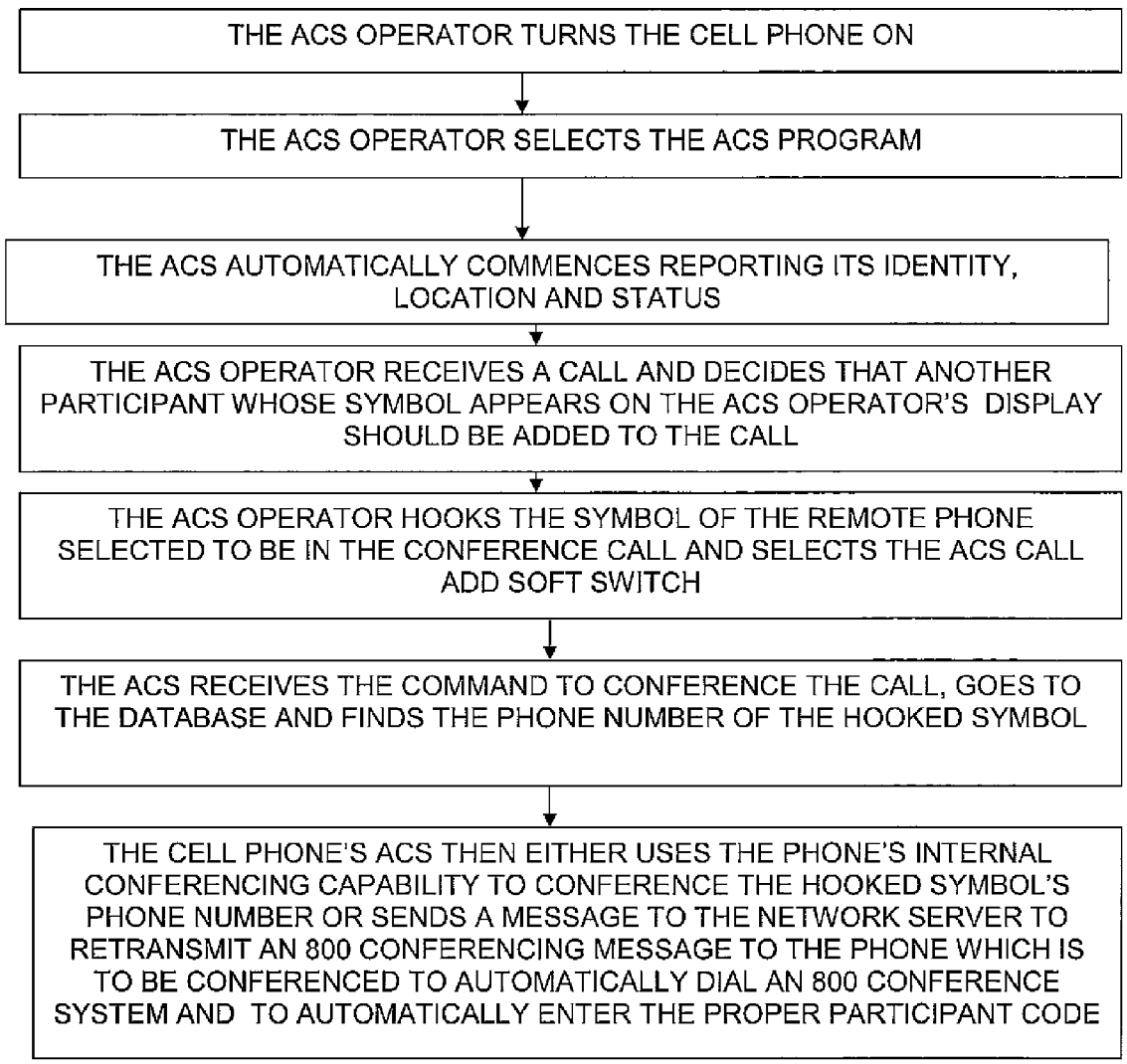
FIG. 2c shows a flow chart for a cell phone user to add another party in the cell phone network to an existing call.

Referring now to FIG. 2c, in order to enable the operator to easily add people to a conference call, the cell phone/PDA ACS program enables the adding of network participants to a call by "hooking" the symbol of the network participant to be added to the call and selecting the appropriate soft switch. The cell phone/PDA ACS then conferences that number with the existing call using the cell phone's internal conferencing capability or sends a digital message to the remote cell phone causing the remote cell phone to automatically call an 800 conferencing number and to enter the applicable participant code. FIG. 2c shows a flow chart that describes the method that allows for conferencing a network participant or fixed facility that is in its database with an existing phone call.

Figure 3A:
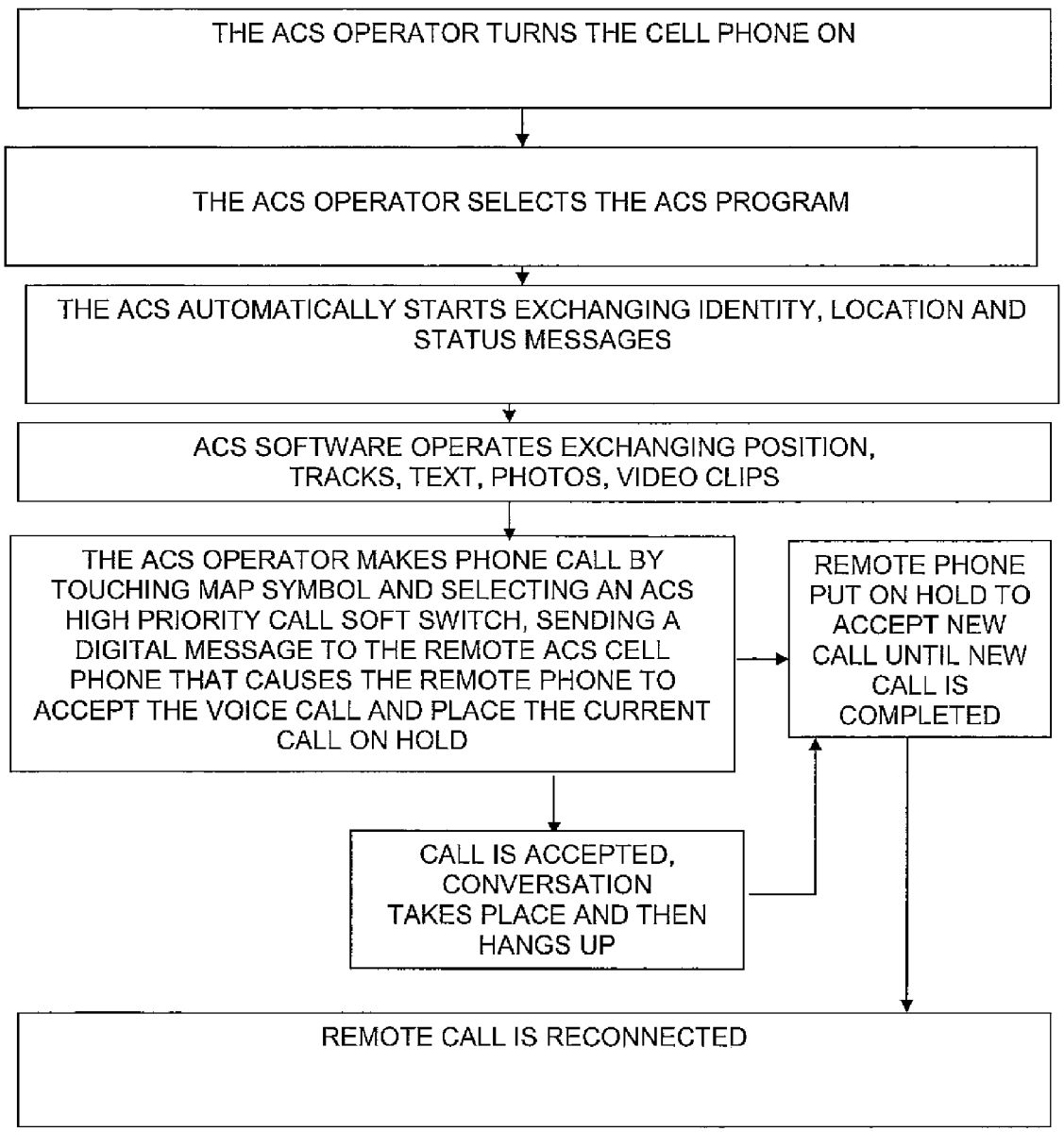
FIG. 3a shows a flow chart of a method for a user cell phone to interrupt a remote cell phone's existing phone call (phone is busy) and to force the remote cell phone to accept a high priority call.

Referring now to FIG. 3a, each user's cell phone/PDA with ACS can cause a remote network participant's cell phone to accept a voice telephone call even though the remote cell phone is busy and in use on a different call. This is especially important during an emergency. If a particular individual in charge of the emergency operation such as police chief needs to talk to one or more network participants, the police chief can select an auto-accept ACS soft switch which causes a digital message to be sent to one of, a group of, or all of the remote phones, with ACS, in the network. If, when the remote phone receives the digital message, the remote ACS equipped cell phone is in the midst of a conversation, the remote phone sends a prerecorded voice message to the other parties in the conversation that these parties are being put on hold so that a high priority conference call can take place. The high priority call is then automatically connected. Once the high priority call is completed, the remote user's phone, which was busy, automatically reverts to its previous call. Thus, each user's cell phone includes an ACS program that, when activated through soft switches, has the ability to interrupt a busy network participant's voice telephone call, to automatically put the network participant's call on hold, to inform the party that is to be put on hold by digitized voice that there is an important emergency call occurring and, once the emergency call is completed, to automatically reconnect the party that had been placed on hold.

Figure 3B:
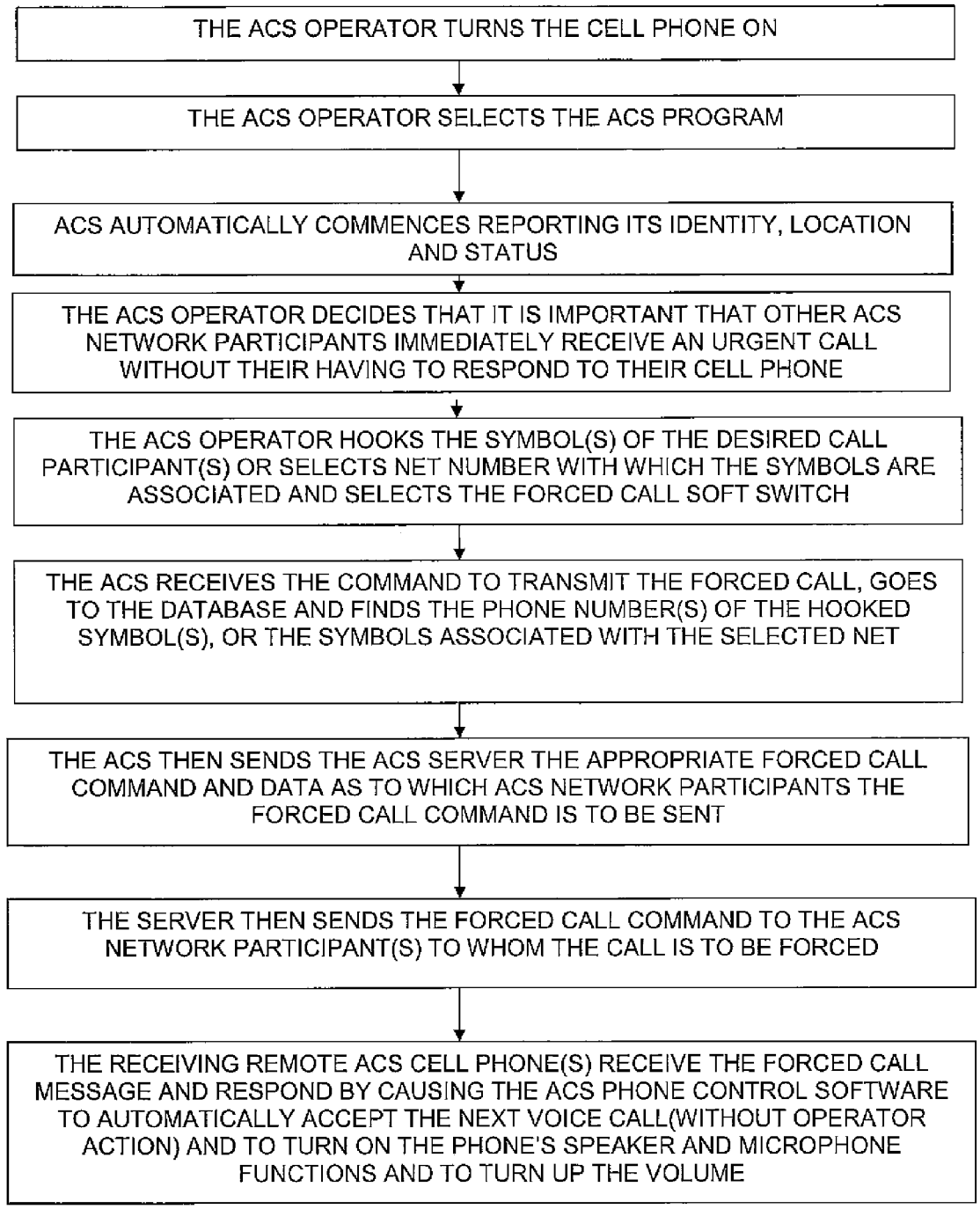
FIG. 3b shows a flow chart of a method for a user cell phone to force a remote cell phone to automatically accept a call (without any action on remote user's part) and to activate the remote user's microphone and speaker, and to play a message pre-recorded in the remote user's cell phone.

Referring now to FIG. 3b, a cell phone/PDA operator can easily cause the operator's voice to be immediately heard by a network participant remote cell phone user in the same manner as would occur with a conventional two-way radio. The remote user does not answer a cell phone call but simply hears the voice of the transmitting party. The operator of the cell phone/PDA hooks the remote network participant cell phone's symbols to which the call is to be sent and selects the forced call soft switch which then causes the ACS program to send a digital message to the remote phone to automatically accept the voice call (without any action on the part of the receiving party) and to turn on the speaker and microphone functions of the remote phone and to turn up the phone's speaker volume. Thus, instead of a ring, the remote phone broadcasts the calling voice on the speaker without any action on the remote participant's part. FIG. 3b shows a flow chart that describes how a digital message is sent to the remote network participant's phone that forces the remote ACS cell phone/PDA to automatically accept a call without any action and causes the remote participant to hear the voice of the calling party.

Figure 4:
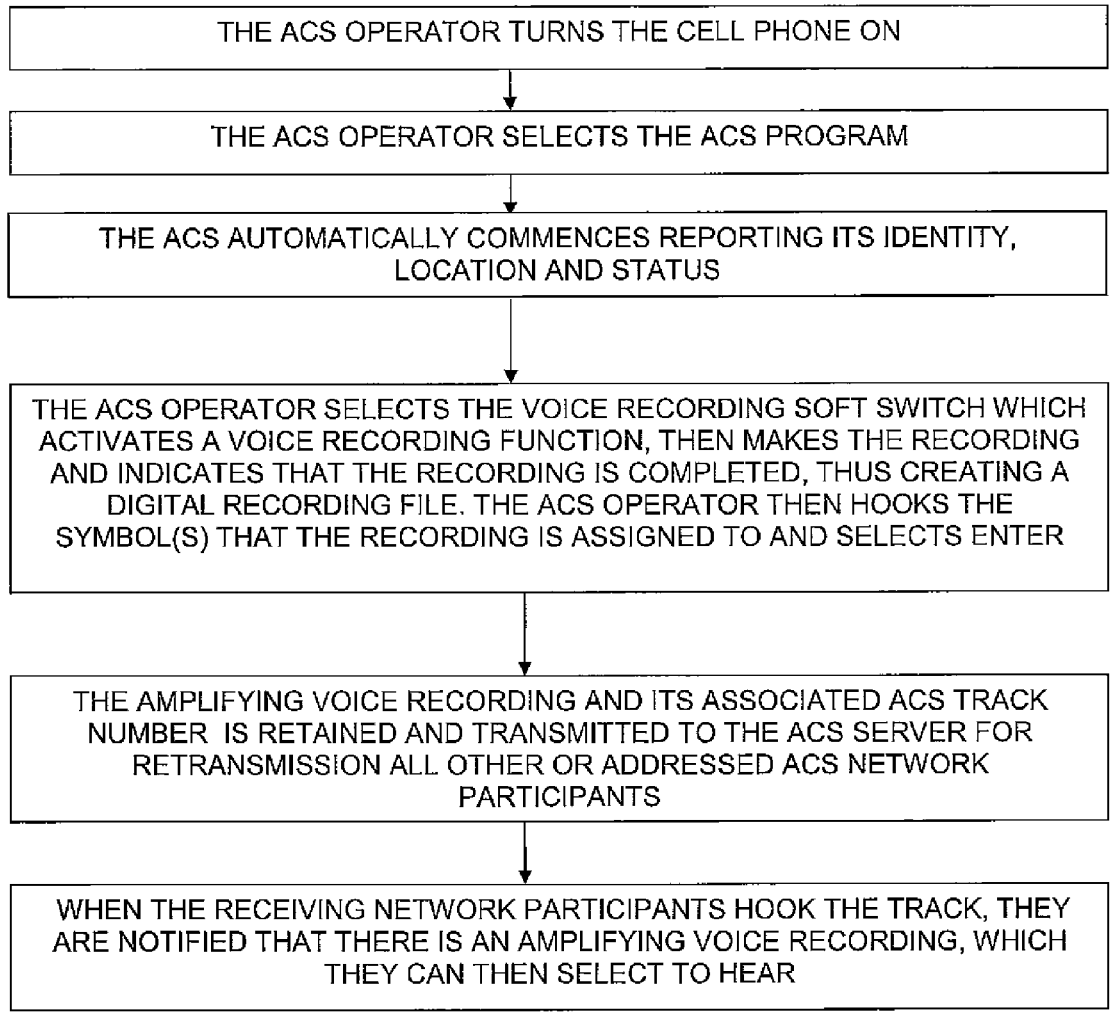
FIG. 4 shows a flow chart of a method for attaching voice recordings to cell phone screen display symbols representing remote participants that can move or be stable and that are automatically pushed to network participants.

Referring now to FIG. 4, in order to enable the cell phone/PDA user to quickly make and attach a voice recording to a symbol, the network communication software uses the voice recording functions of the PDA cell phone. Once the recording has been made, the ACS provides the ability to associate the "voice recording" to a track by hooking the symbol and then selecting a soft switch that associates the voice recording to the symbol. This voice recording file is then transmitted with the associated symbol's track number to the server for retransmission to one or more network participants. When the network participants) receive the symbol's track number and voice recording, it is stored in their database; when they then "hook" the symbol they hear the recorded message. FIG. 4 shows a flow chart that describes how a user can associate a voice recording with a symbol that has been hooked by the user and transmit the symbol and its associated voice recording to network participants so that each of the network participants hears the voice recording when the symbol is hooked.

The instant invention has been shown and described herein in what is considered to be the most practical and preferred embodiment. It is recognized, however, that departures may be made there from within the scope of the invention and that obvious modifications will occur to a person skilled in the art.

What is claimed is:

1. A method of providing a cellular phone communication network for designated participating users, each having a similarly equipped cellular phone that includes a CPU, GPS navigational system and a touch screen display having one or more soft switches and associated software to affect the cell phone operation to enable the user's cell phone to perform various functions by hooking network participant's symbols, comprising the steps of:
 a) exchanging position and status information from one user among all of the other users equipped with cellular phone/PDA/GPS system and its associated software;
 b1) entering of other entities of interest into the cellular phone CPU and assigning the other entities of interest a category;
 b2) generating the latitude and longitude of the entities of interest along with their categories being automatically sent on the communications network;
 c) generating rapid call initiation to one or more locations whose phone number is available in a geographical referenced database using the touch screen;
 d) generating rapid call initiation to the users of the cellular phone/PDA/GPS network system using the touch screen;
 e) generating rapidly sent text messages, photographs, and video to another cellular phone using the touch screen;
 f) providing rapid conference calling multiple phones that are contained within the geographical referenced data base;
 g) initiating remote control from one cellular phone/PDA/GPS system to any of the other cellular phone/PDA/GPS system phones, including the ability to control remote cellular phones to make verbal announcements, display images, place return calls, place calls to another phone number, vibrate, change sound intensity and process and display pre-stored data, images and video;

h) activating a soft switch and the software accessed by said soft switch that forwards a voice call to another phone by hooking it;

i) activating a soft switch and the software accessed by said soft switch that forwards text messages, photographs and video by hooking one or more symbols representing remote cellular phone devices or one soft switch to call all on the network; and j) activating a soft switch and the software accessed by said soft switch that adds another party to an existing phone call by hooking the displayed remote phone symbol of the other party.

2. A method as in claim 1 of providing cell phone soft switches and associated software to affect the operation of a remote cell phone that are designed to enable communications where they are not normally possible, including the additional step of k) activating a soft switch and the software accessed by said soft switch that sends a digital message(s) from a network participant to a remote network participant'(s) phone(s) causing a busy remote phone(s) to accept a high priority call from the network participant and to place the previous call on hold and to then reconnect the previous call when the high priority call is completed.

3. The method as in claim 1 including the additional step of:

l) activating a soft switch and the software accessed by said soft switch that sends a digital message to a remote network participant' (s) phone(s) causing the remote phone(s) to automatically answer (without operator action) a call and to activate the remote phone's microphone and speaker so that the network participant initiating the call is immediately heard.

4. A communication system to provide a cellular phone network for a group of participants, each of the participants having an individual portable cellular phone that includes a voice communication, free and operator selected text messages, photographs and video, a CPU and a GPS navigational system that can accurately determine the location of each cellular phone, each of the cellular phones in the communications net of participants containing:

said CPU and memory;

a touch screen display;

symbol generator in said CPU that can generate symbols that represent each of the participants in the communication network on the display screen;

a database that stores the individual telephone numbers related to each of the symbols each of which represents a participant in the communication network;

cellular phone call initiating software in said CPU connected to the telephone number database and the touch screen and the symbols on the touch screen whereby touching an individual symbol will automatically initiate a cellular phone telephone call to the user represented by the symbol that includes said voice communication, free and operator selected text messages, photographs and video;

said display including databases that display geographical information that includes showing the geographical location of each of the symbols representing participants in the communication network, fixed locations, and entered items of interest;

soft switch and the software accessed by said soft switch that forwards a voice call to another phone by hooking the displayed symbol of the other party;

soft switch and the software accessed by said soft switch that forwards text messages, photographs and video by hooking each symbol or to all symbols on the network; and soft switch and the software accessed by said soft switch that adds another party to an existing phone call by hooking the other party's symbol.

5. The system as in claim 4, including:

soft switch and the software accessed by said soft switch that sends a digital message(s) from a network participant to a remote network participant'(s) phone(s) causing a busy remote phone(s) to accept a high priority call from the network participant and to place the previous call on hold and to then reconnect the previous call when the high priority call is completed.

6. The system as in claim 4, including:

soft switch and the software accessed by said soft switch that sends a digital message to a remote network participant'(s) phone(s) causing the remote phone(s) to automatically answer (without operator action) a call and to activate the remote phone's microphone and speaker so that the network participant initiating the call is immediately heard.

7. The system as in claim 4, including:

soft switch and the software accessed by said soft switch that permits a voice recording to be used to amplify a displayed symbol so that, when network participants hook the symbol, the voice recording associated with the symbol is heard.

8. A cellular phone for use in a communication network for a plurality of participants comprising:

cellular phone transmitter and receiver;

small handheld portable housing containing said cellular phone transmitter and receiver;

touch display screen mounted in said housing;

modem connected to said cellular phone transmitter and receiver;

CPU connected to said cellular phone transmitter and receiver;

GPS navigation system connected to said CPU and to said cellular phone transmitter and receiver on said touch screen;

database connected to said CPU that includes the symbol of a list of telephone numbers that relate to specific symbols;

symbol generator connected to said CPU and said database for generating symbols on said touch screen, each of said symbols representing a participant in a communication network that has a cellular phone;

CPU software for selectively polling other participants with a cellular phone;

call initiating software connected through said CPU and said telephone database and said symbol generator whereby when a user touches the symbol displayed on a display screen the cellular phone call is automatically initiated to the cellular phone represented by the symbol;

geographical database connected to said CPU to provide a geographical display on said touch screen representing a defined geographical area that also displays symbols representing each of the participants that has an identical cellular phone by latitude and longitude;

soft switch and the software accessed by said soft switch that forwards a voice call to another phone by hooking the other phone displayed symbol;

soft switch and the software accessed by said soft switch that forwards text messages, photographs and video to one or more participants by hooking their displayed symbols; and soft switch and the software accessed by said soft switch that adds another party to an existing phone call by hooking the other party's displayed symbol.

9. The cell phone as in claim 8, including:

soft switch and the software accessed by said soft switch that sends a digital message(s) from a network participant to a remote network participant'(s) phone(s) causing a busy remote phone(s) to accept a high priority call from the network participant and to place the previous call on hold and to then reconnect the previous call when the high priority call is completed.

10. The cell phone as in claim 8, including:

soft switch and the software accessed by said soft switch that sends a digital message to a remote network participant'(s) phone(s) causing the remote phone(s) to automatically answer (without operator action) a call and to activate the remote phone's microphone and speaker so that the network participant initiating the call is immediately heard.

11. The cell phone as in claim 8, including:

soft switch and the software accessed by said soft switch that permits a voice recording to be used to amplify a displayed symbol so that when network participants hook the symbol the voice recording associated with the symbol is heard.

\* \* \* \* \*